United States Patent [19]
Gysel et al.

[11] Patent Number: 5,633,863
[45] Date of Patent: May 27, 1997

[54] ECHO CANCELER

[75] Inventors: Peter Gysel, Zurich; Bruno Wenger, AU/ZH; August Kalin, Bonstetten; Daniel Muller, Zurich, all of Switzerland

[73] Assignee: Siemens Schweiz AG, Zurich, Switzerland

[21] Appl. No.: 498,765

[22] Filed: Jul. 6, 1995

[30] Foreign Application Priority Data

| Jul. 7, 1994 | [CH] | Switzerland | 02170/94 |
| Jul. 7, 1994 | [CH] | Switzerland | 02171/94 |
| Jun. 19, 1995 | [CH] | Switzerland | 01793/95 |
| Jun. 23, 1995 | [CH] | Switzerland | 01852/95 |

[51] Int. Cl.$^6$ .................................................. H04B 3/23
[52] U.S. Cl. ............................................... 370/290
[58] Field of Search .................. 370/32.1, 32; 379/410, 379/411, 406; 375/222, 229, 932

[56] References Cited

U.S. PATENT DOCUMENTS

| 4,600,815 | 7/1986 | Horna. | |
| 5,084,685 | 1/1992 | Kioke | 370/32.1 |
| 5,148,427 | 9/1992 | Buttle et al. | 370/32.1 |
| 5,317,596 | 5/1994 | Ho et al. | 370/32.1 |

FOREIGN PATENT DOCUMENTS

| 0384490 | 8/1990 | European Pat. Off. . |
| 0464500 | 1/1992 | European Pat. Off. . |
| 4138567 | 6/1992 | Germany . |
| 2253771 | 9/1992 | United Kingdom . |

OTHER PUBLICATIONS

"High Bit Rate Digital Subsriber Lines: A Review of HDSL Progress", J.W. Lechleider, I.E.E.E. Journal on Sel. Areas in Com., 9(6); pp. 789–784, Aug. 1991.

"A New DIgital Echo Canceler for Two–Wire Subscriber Lines", N. Holte and S. Stueflotten, I.E.E.E. Trans. on Communications, 29(11); pp. 1573–1581, Nov. 1981.

"Linear Echo Cancellation Using Optimized Recursive Prefilterimg", A. Kaelin et al., Proc. I.E.E.E. Int. Symp. on Circuits and Systems, Chicago, pp. 463 to 466, 1993.

"Nonlinear Echo Cancelers Based on Transpose Distributed Arithmetic" M.J. Smith, C.F.N. Cowan, and P.F. Adams, I.E.E.E. Transactions on Circuits and Systems, vol. 35, No. 1, Jan. 1988.

"A Hybrid HDSL Echo Canceler", D. Mueller and A. Kaeln, Proc. I.E.E.E. Int. Symp. on Circuits and Systems, Seattle, WA, Mar. 1995.

*Primary Examiner*—Douglas W. Olms
*Assistant Examiner*—Ajit Patel
*Attorney, Agent, or Firm*—Greenblum & Bernstein, P.L.C.

[57] ABSTRACT

Echo canceler. A circuit arrangement for the cancellation of echo signals, wherein in the received path, an analog/digital converter is connected with a first adder and a second adder is interposed after the analog/digital converter, with the estimated echo signal being divided into first and second portions, whereby the first portion is transmitted to the first adder and the second portion is transmitted to the second adder for the production of the received signal. In a further embodiment, a third adder is interposed between the analog/ digital converter and the second adder, via which the output signal of a compensation filter is added to the signal in the received path.

13 Claims, 9 Drawing Sheets

ECHO CANCELER

CROSS REFERENCE TO RELATED APPLICATIONS

This application claims the priority of Swiss Application No. 02 170/94-4, filed Jul. 7, 1994; Swiss Application No. 02 171/94-6, filed Jul. 7, 1994; Swiss Application No. 01 793/95-9, filed Jun. 19, 1995; and Swiss Application No. 01 852/95-0, filed Jun. 23, 1995, the disclosures of which are incorporated herein by reference in their entireties.

BACKGROUND OF THE INVENTION

1. Field of the Invention

The present invention pertains to a circuit arrangement for the cancellation of echo signals comprised of a send path carrying a send signal; a receiving path carrying a received signal; an adaptive filter; an analog first adder; a first digital/analog converter; a transmission unit; and a two line wire attached to the transmission unit, wherein over the two line wire at least the send signal, the received signal and echo signal portions are transmitted, with the send path and the received path being connected with the transmission unit, with the send signal being transmitted to the adaptive filter for the estimation of the echo signal and the estimated digital echo signal being transmitted over the first digital/analog converter to the first analog adder, with the first analog adder being located in the received path, for the reduction of the echo signal portion in the received signal.

2. Discussion of the Background of the Invention and Material Information

Copper lines or wires continue to serve as the main transmission medium of the transfer of data between a subscriber connection and the communications office of a public communication network. A subscriber connection must, on one side, be economically advantageous for the subscriber, yet on the other hand, it is desirable to realize the highest possible data transmission rate. Via the replacement of copper wires with glass fiber cables, the noted second condition could be largely fulfilled, however, this would be coupled with substantially increased costs, since the existing detailed distribution net would have to be completely replaced. For this very reason, the development of a fast digital fully duplex data transmission line, via copper wires, has already been suggested repeatedly. An overview of this suggested data transmission, denoted as HDSL (High Bit Rate Digital Subscriber Line) was, for example, published in an article by J. W. Lechleider, entitled "High Bit Rate Digital Subscriber Lines: A Review of HDSL Progress" published in the IEEE Journal on Sel. Areas in Com., 9(6); pages 769–784, August 1991.

With HDSL data transmission, data is transmitted in both directions via a copper cable. A so-called transmission unit, also denominated as terminating unit, controls the directional separation of the signals to be sent and to be received. Since this directional separation, particularly due to the change in characteristics of the lines, cannot be perfectly realized, the signal received, by a distant subscriber, is superimposed with an echo signal (also denominated as error signal) of the nearby subscriber. The echo signal can be about 30 to 40 dB stronger than the actual useful signal. In order to achieve, at the receiver, the required bit error rate of about $10^{-7}$, an adaptive compensation of the echo is undertaken, in that, via the use of an adaptive filter, the echo signal is estimated and subtracted from the received signal. For such an adaptive filter, for example, FIR (Finite Impulse Response) filters are utilized, which can have 90 to 100 coefficients (Taps) and as a result thereof require a correspondingly large basic circuit block. In order to reduce the circuit expenditure, European Patent Application EP-0 384 490 discloses an echo compensator with an adaptive filter that is comprised of an FIR (Finite Impulse Response) and an IIR (Infinite Impulse Response) filter, in a tandem or cascade connection. Therewith, a reduction of the circuit expenditure for the adaptive filter is achieved, however with this adaptive filter, non-linearities in the send path cannot be compensated.

In addition, European Patent Application EP-0 464 500 discloses an echo compensator in which the estimated echo signal is totally compensated in the analog portion. As a result thereof, even though the circuit expenditure for both the analog/digital converter and the succeeding adder in the received path is reduced, there remains the substantial requirements for the linearity of the digital/analog converters utilized for the transformation of the estimated echo signal. Thus, the reduction of the circuit expenditure for the analog/digital converter is largely compensated for by the utilization of the now required digital/analog converter.

The present invention thus has the task or object to produce a circuit arrangement for compensation of error signals with which the circuit expenditure is both further reduced and the estimation of the echo signal is increased.

SUMMARY OF THE INVENTION

This task or object is achieved via the features set forth in the appended claims. Specifically, one embodiment of this invention pertains to a circuit arrangement comprised of a send path carrying a send signal; a receiving path carrying a received signal; an adaptive filter; an analog first adder; a first digital/analog converter; a transmission unit; and a two line wire attached to the transmission unit, wherein over the two line wire at least the send signal, the received signal and echo signal portions are transmitted, with the send path and the received path being connected with the transmission unit, with the send signal being transmitted to the adaptive filter for the estimation of the echo signal and the estimated digital echo signal being transmitted over the first digital/analog converter to the first analog adder, with the first analog adder being located in the received path, for the reduction of the echo signal portion in the received signal, wherein the first adder, viewed in the direction of transmission, is followed by an analog/digital converter, with the analog/digital converter in turn being followed by a digital second adder, and a first portion of the estimated echo signal being transmitted to the first adder and a second portion of the estimated echo signal being transmitted to the second adder, for the production of the received signal.

In a further embodiment of the circuit arrangement of this invention, means for the full utilization of the dynamic range are provided for the analog/digital converter and therefore for the automatic adaptation to differing lengths of the two line wire.

In another embodiment of the circuit arrangement of this invention, the means for the adaptation to differing line lengths are comprised of a bit shift unit; an amplifier unit; and a received signal measuring unit; with the bit shift unit being provided upstream of the second adder in the signal transmission direction; with the amplifier unit being provided between the first adder and the analog/digital converter and wherein the received signal measuring unit is impressed with the received signal for the control of the bit shift unit and the amplifier unit.

In a differing embodiment of the circuit arrangement of this invention, the means for the adaptation onto differing line lengths are comprised of an adjustable amplifier and a detector, the adjustable amplifier, viewed in the signal transmission direction, being provided upstream of the first adder and the detector being impressed with the output signal of the analog/digital converter for the control of the adjustable amplifier.

In still a further embodiment of the circuit arrangement of this invention, a digital third adder is provided between the analog/digital converter and the second adder is provided in the received path, and means are provided for the compensation of non-idealities of the analog/digital converter, the first adder, the digital/analog converter and additional signal processing units are located between the first portion of the estimated echo signal and the third adder, with the means for the compensation of non-idealities of the analog/digital converter being impacted by the first portion of the estimated echo signal, as a result of which a compensation signal is produced, with said compensation signal being subtracted by the third adder from the signal in the received path.

In still another embodiment of the circuit arrangement of this invention, a digital third adder is switched, when viewed in the direction of transmission, after the second adder; and means are provided for the compensation of the non-idealities of the analog/digital converter, the first adder, the digital/analog converter and additional signal processing units are located between the first portion of the estimated echo signal and the third adder, with the means provided for the compensation of the non-idealities of the analog/digital converter being impacted by the first portion of the estimated echo signal, as a result of which a compensation signal is produced, with said compensation signal being subtracted by the third adder from the signal in the received path.

In still a differing embodiment of the circuit arrangement of this invention, the adaptive filter is impressed for the adaptation with the received signal.

In yet a further embodiment of the circuit arrangement of this invention, the adaptive filter is impressed for the adaptation with the output signal of the third adder.

In yet another embodiment of the circuit arrangement of this invention, the adaptive filter is impressed for the adaptation with the output signal of the second adder.

In yet a differing embodiment of the circuit arrangement of this invention, the means for the compensation of the non-idealities are impressed for the adaptation with the received signal.

In a still further embodiment of the circuit arrangement of this invention, the means for the compensation of the non-idealities are impressed for the adaptation with the output signal of the third adder.

In a still another embodiment of the circuit arrangement of this invention, the means for the compensation of the non-idealities are comprised of an adaptive filter of the storage compensation type.

In a still differing embodiment of the circuit arrangement of this invention, the adaptive filter is comprised of at least one of a FIR (Finite Impulse Response) filter portion (FIR) and an IIR (Infinite Impulse Response) filter portion (IIR), wherein the FIR filter portion is of the storage compensation type.

In a yet further embodiment of the circuit arrangement of this invention, a second digital/analog converter and a second filter are provided in the send path, with the second filter being input-connected with the digital/analog converter and output-connected with the transmission unit, and wherein the digital/analog converter is impressed with the send signal. Preferably, the send signal is tetravalent and the digital/analog converter includes two bits, whereby the FIR filter portion is so adaptively adjusted that non-idealities are corrected. Preferably again, the non-idealities are non-linearities of the digital/analog converter.

In yet another embodiment of the circuit arrangement of this invention, the send signal filter produces a predetermined pulse form at the outlet of the send filter. Preferably, the send filter has a transfer function $T(s)=T_1(s)*T_2(s)$, wherein:

$$T_1(s) = 0.3940 * \frac{s^2 + 1.1834*10^6*s + 2.4134*10^{13}}{s^2 + 4.9598*10^6*s + 1.3263*10^{13}}$$

and $$T_2(s) = \frac{1}{0.3940} * \frac{6.1007*10^{12}}{s^2 + 5.2757*10^6*s + 1.1154*10^{13}}$$

In yet a differing embodiment of the signal circuit of this invention, characteristic pole positions, corresponding to the transmission characteristics of the two wire line, are fixed for the IIR filter portion.

In that the estimated echo signal is divided in a first portion for the analog pre-compensation and in a second portion for digital compensation, the resolution of the analog/digital converter, required in the received path is reduced. In addition, the proposed division permits the use of a non-linear compensation filter based upon the storage compensation principle. This in turn leads to substantially simpler requirements with references to linearity and resolution of the digital/analog converter.

A further significant reduction of the circuit expenditure is achieved, in that for the actual echo compensator an optimized combination of FIR and IIR filter is utilized. Instabilities of the IIR filter are avoided in that only linearly adjustable coefficients are adapted and the poles are optimized with the help of "a priori" knowledge.

With the realization or during the implementation of the circuit arrangement via chip integration (as so-called integrated circuits) a reduction of the circuit expenditure is of significance not only in terms of space but also particularly with the coupled and reduced energy usage since such usage, with the same technology, also increases with increasing size of the switching arrangement. The particular significance of this last noted advantage results from the fact that the energy, available to the subscriber, is limited via the now-existing energy production facilities. Additional sources of energy are not contemplated.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
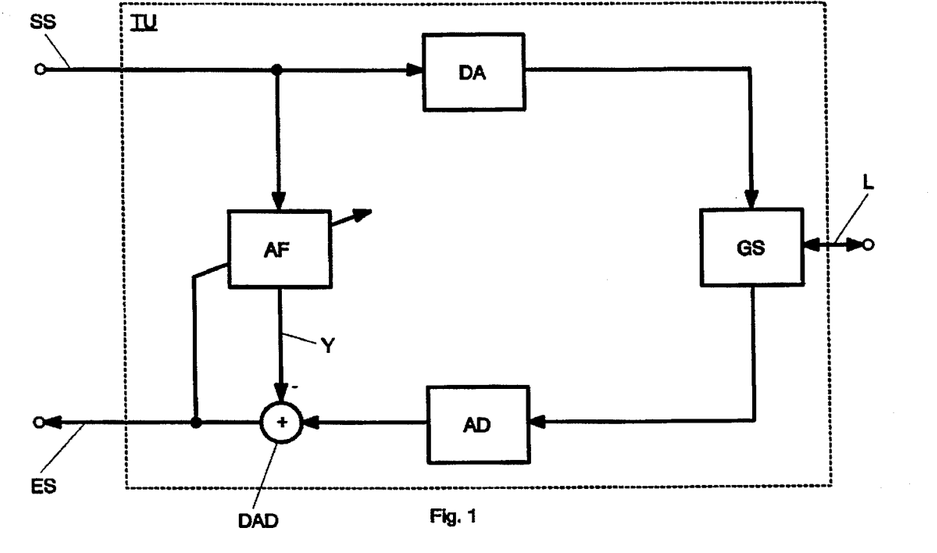
FIG. 1 is a transmission network of a prior art echo canceler utilizing digital compensation of the echo signal.

FIG. 1 shows a known transmission network TU for the separation of analog information, transmitted over a two wire line in both directions, into a digital send signal SS and into a digital received signal ES. The transmission network TU includes essentially a send path for the send signal SS comprising a digital/analog convertor DA and a received path for the received signal ES comprising an analog/digital converter AD and an adder DAD, wherein digital/analog converter DA, for the transmission of the analog send signal SS, and the analog/digital converter AD, for the reception of the analog received signal ES, are coupled to a transmission unit GS. With the implementation of transmission unit GS, as a result of non-idealities, at least a portion of send signal SS is directly transmitted to the received path. In addition, an unacceptable echo of send signal SS, produced at remote locations of the two wire line, enters the received path. Therewith, the actual received signal is superimposed with an error signal comprised of both of the previously noted components. Hereinafter, this error signal is generally designated as "echo signal." In order to achieve the desired bit error rate, noted in the introduction, for this reason an adaptive filter AF is utilized, via which an echo signal Y is estimated and subsequently utilized for the restoration of the actual received signal ES. For this reason, the adder DAD is switched after analog/digital converter AD, in the received path, in which the estimated echo signal Y is subtracted from the received signal. Therefore, at the outlet or output of the transmission network TU, the approximate received signal is available for use.

Since the echo signal also changes due to changes in the line characteristics, the coefficients of filter AF must constantly be adapted to the new requirements. This can be accomplished for example, via the known LMS (Least Mean Square) Algorithms or the LMS variation with the aid of which the coefficients of filter AF are adapted. Reference can be made to the books by B. Widrow and S. D. Stearns, "Adaptive Signal Processing", published by Prentice-Hall, Inc., Englewood Cliffs, N.J., in 1985; and C. Cowan and P. Grant, "Adaptive Filters," similarly published by Prentice-Hall in 1985.

Figure 2:
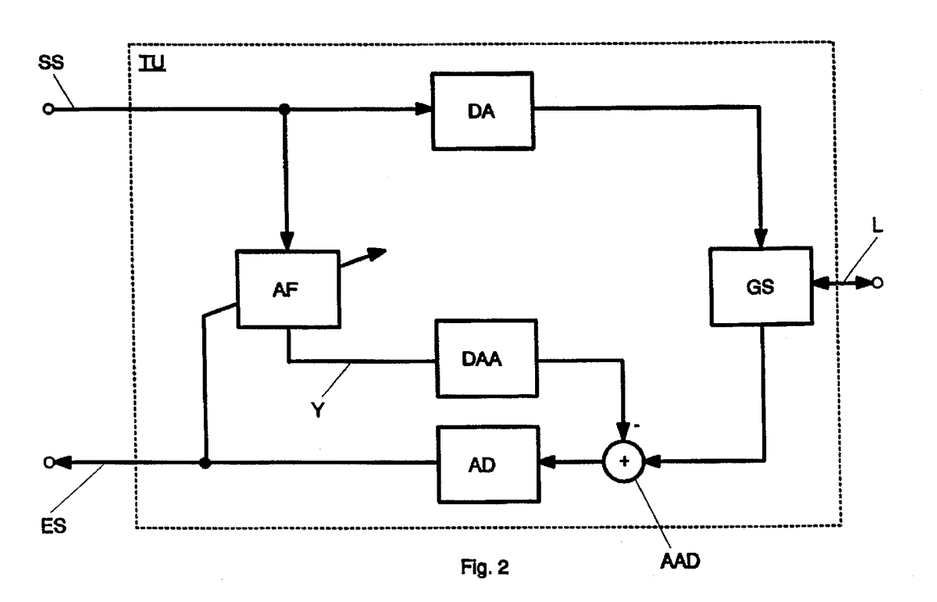
FIG. 2 is the transmission network with a prior art echo canceler utilizing analog compensation of the echo signal.

FIG. 2 shows a know further development of the transmission network TU of FIG. 1, corresponding to the teaching of European Patent Application EP-0 464 500, wherein, differing from the solution of FIG. 1, the echo compensation is now fully accomplished in the analog region of the received path. For this, a second digital/analog converter DAA becomes necessary, which converts the digital echo signal, estimated by adaptive filter AF, into a analog echo signal. Thereafter, with an analog adder ADD, the estimated echo signal Y is subtracted from the received signal upstream of analog/digital converter AD. Herewith, the requirements for the resolution of the analog/digital converter AD are typically reduced from 14 bits to 9 bits. In order to however process the echo compensation with the required accuracy of 14 bits, the digital/analog converter DAC must operate with 14 bit resolution. The problem of the circuit expenditure thus is essentially shifted from analog/digital converter AD to digital/analog converter DAA.

Figure 3:
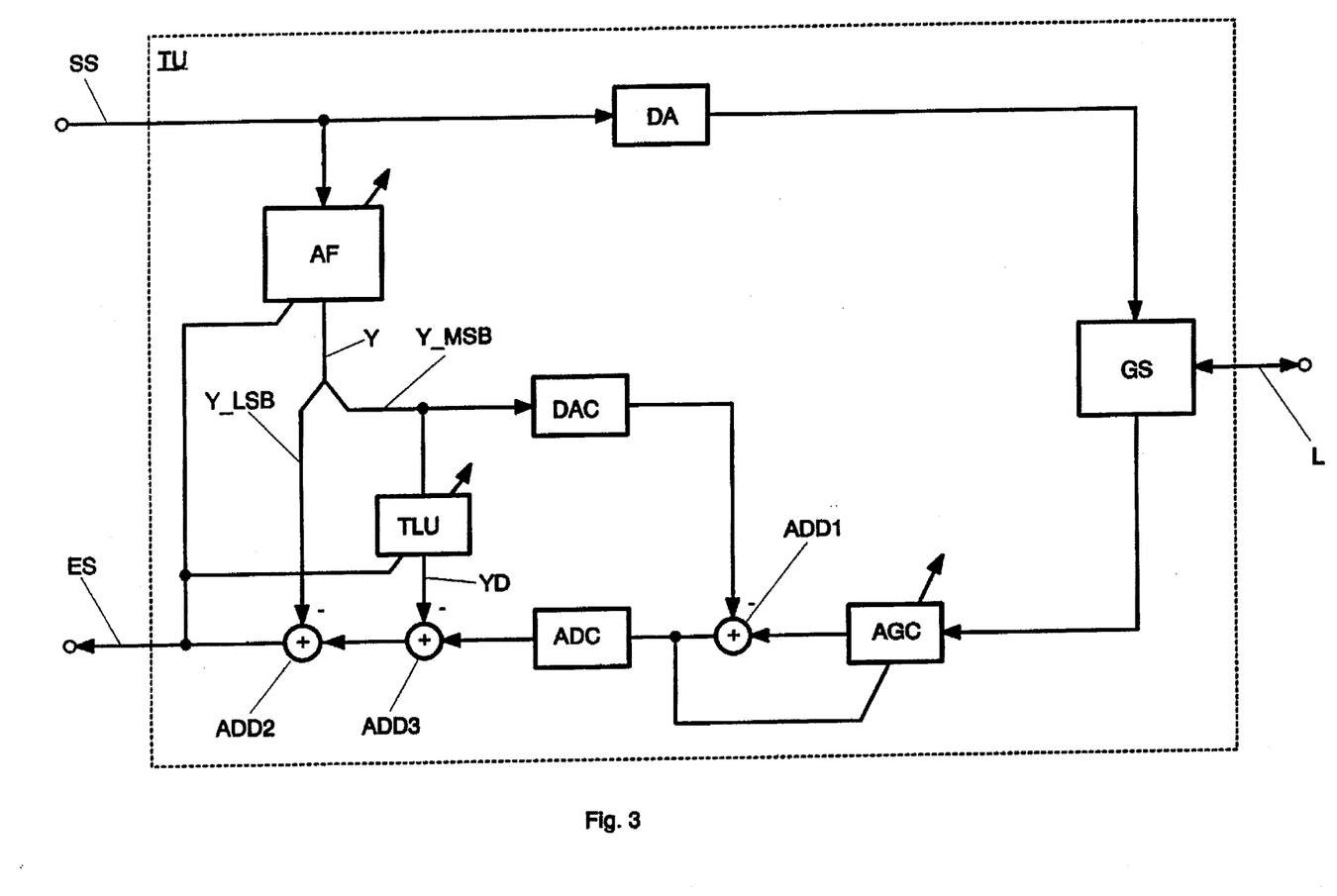
FIG. 3 is the transmission network with the inventive echo canceler of this invention having an analog pre-compensator and a digital compensator.

FIG. 3 shows the constructive principle of inventive transmission network TU of this invention, which includes a send path carrying a send signal SS, a receiver path carrying a received signal ES and a transmission unit GS, wherein the received path is essentially comprised of an adjustable amplification unit AGC, an analog first adder ADD1, an analog/digital converter ADC and second and third adders ADD2 and ADD3, respectively. Interposed between the send path and the received path are an adaptive filter AF, a first digital/analog converter DAC, and a compensation filter TLU, which together with existing adders ADD1, ADD2 and ADD3, in the received path, form an echo compensator. Finally, the send path is essentially comprised of a second digital/analog converter DA.

In order to maintain simplicity, in FIG. 3, as well in the following FIGS. 4 to 7, the usually occurring amplification multipliers, low-pass and high-pass filters, etc. are not shown. Such additional signal processing units are noted in the following description only when it is absolutely necessary for the understanding of the function of the circuit arrangement.

In the following working example or embodiment it is presumed that send signal SS is available as a tetravalent signal that is produced via the transformation of a binary data stream, for example, with the aid of a 2B1Q encoder, not shown in FIG. 3. Therein, the 2B1Q encoder always transforms or converts two bits of the binary data stream into a tetravalent symbol, wherein the following data scheme is utilized: the binary sequence "00" changes to −3, "01" to −1, "11" to +1 and "10" to +3. Herewith, a transmission rate of 1168 bits/s is converted to a symbol rate of 584 kS/s. The tetravalent send signal SS, on one side, is conveyed to adaptive filter AF, and on the other side, to second digital/analog converter DA, in which the possible symbol values are converted into voltage values, for example into −3, −1, +1 and 3 volts. This now analog signal is then initially sent via a send filter that is not illustrated in FIG. 2 but which will be explained in more detail later, and thereafter transmitted to transmission unit GS which then connects the signal, ideally without changing same, into two wire line L. On the received side, in an analog manner, the signal received via the two line wire L is balanced and assigned to the received path. The transmission unit GS has, as a result thereof, the function of a terminating unit in the manner usually utilized in terminal or hybrid units, which takes the signals, transmitted over two wire L and, correspondingly to the direction of transmission, separates or unites same. Ideal transmission units GS of the noted type however are not feasible, since the damping between the send and received paths is always finite. Herewith there is normally a so-called cross talk between the send and received paths, also known as NEXT (Near End Cross Talk), upon which the strength and quality of the transmission unit GS is dependent. In addition, echo signals also occur, particularly via reflections at junction points or at line ends of two wire lines L, which also end up in the received path and are superimposed upon the actual received signal.

Further interfering or superiors signals, superimposed on the actual received signal, can also be caused by the signal processing units utilized in transmission network TU, which includes non-idealities, such as for example quantitative errors or non-linearities. Without specific references these further additional interfering signals are also included in the term "echo signal."

As noted, for the elimination of echo signals of the signals received via transmission unit GS an echo compensator is utilized which, as a result of send signal SS, undertakes an estimation or approximation of these echo signals, which are subtracted from the signals received by transmission unit GS. In addition, in the circuit arrangement of this invention, the further interfering signals, caused by the non-idealities of the utilized signal processing units, are extensively compensated.

The adaptive filter AF is impacted with or by send signal SS for the estimation of echo signal Y, from which a first portion Y_MSB, comprised of the highest value bits is transmitted to first digital/analog converter DAC and to compensation filter TLU. The analog output signal of digital/analog converter DAC, corresponding to one portion of the echo signal is subtracted, via first adder ADD1, in the received path. As a result thereof, there occurs an actual analog pre-compensation of the largest amplitude-wire echo portion before or upstream of analog/digital converter ADC.

After or downstream from analog/digital converter ADC, a compensation signal YD, that is produced in compensation filter TLU, is subtracted from the received path by third adder ADD3. Thereafter, there follows, in the received path, when viewed in the direction of the transmission, second adder ADD2, in which a second portion Y_LSB of the estimated echo signal Y is, for the production of received signal ES, subtracted from the signal in the received path. This second part Y_LSB thus corresponds, to the remainder of the low bits of estimated echo signal Y.

The first and second portion Y_MSB and Y_LSB together form the entire width of the estimated echo signal Y. Starting with a 16 bit wide echo signal Y, with which an accuracy of 14 bits can be achieved, a width of 6 bits for first portion Y_MSB and, based thereupon, a width of 10 bits for second portion Y_LSB of echo signal Y has been found be particularly advantageous. It is however expressly noted that in the circuit arrangement of this invention any desired division of the bits of echo signal Y can be undertaken. The only condition is that first part Y_MSB include one or more connected highest value bits (most significant bits) and that the second part Y_LSB include one or more connected low value bits (least significant bits) and that the first and second parts Y_MSB and Y_LSB neither overlap nor that gaps exist between these two portions.

In addition, adjustable amplifier AGC is interposed between transmission unit GS and first adder ADD1, with the amplification thereof, being variable, based upon the output signal of first adder ADD1.

Finally, received signal ES is transmitted to filter AF and to compensation filter TLU. Based upon received signal ES, the parameters of the noted filters are set or adjusted, so that, on one side, a closest possible estimation of the echo signal is made and, on the other side, the non-idealities of the utilized signal processing units can be compensated.

In the following description, the previously-described circuit arrangement, together with its functional manner will be described in yet more detail.

Figure 5:
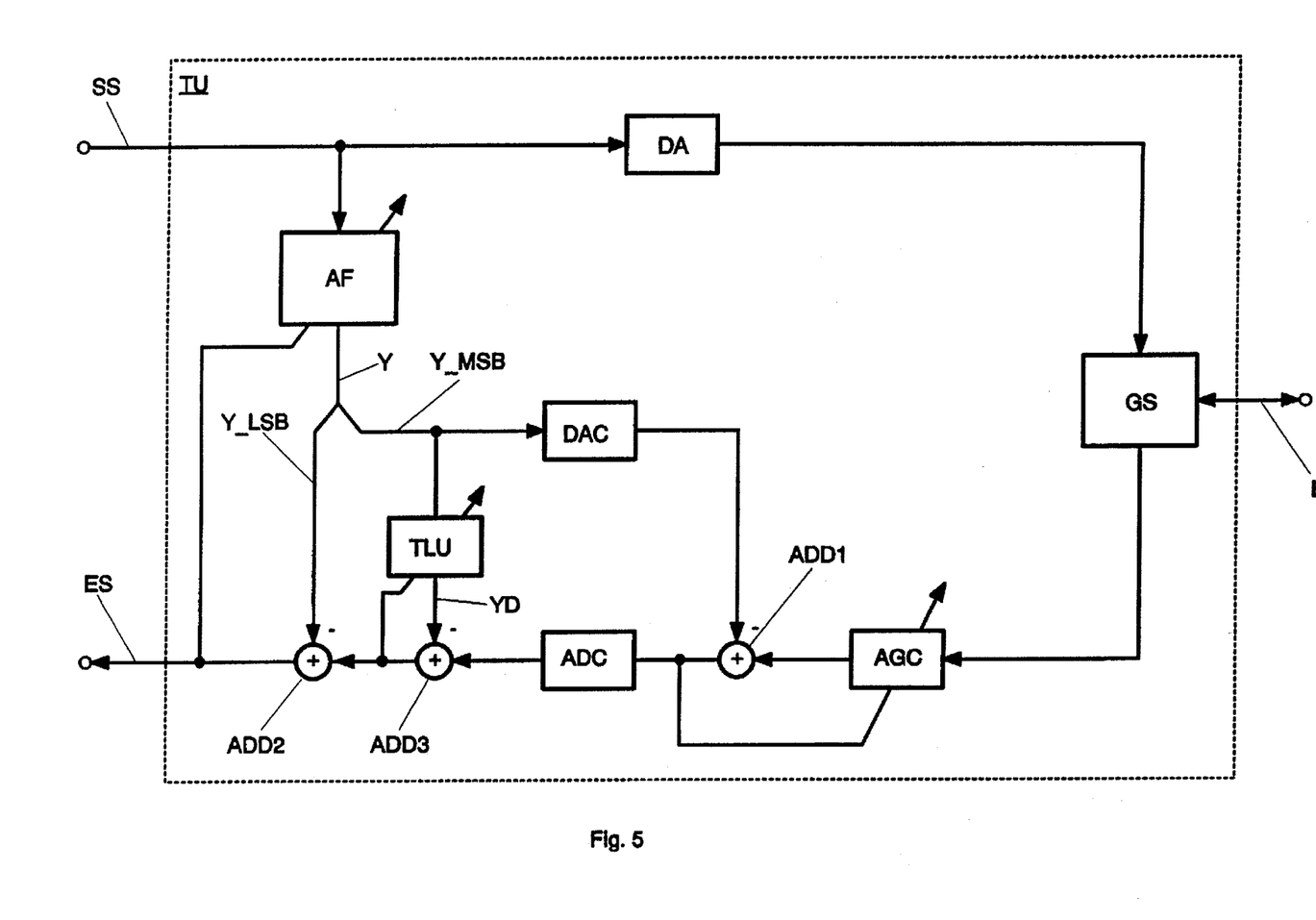

As already noted, adaptive filter AF can take the form of a known FIR (Finite Impulse Response) filter, in which, corresponding to the provided number of coefficients, multiplications and additions can be carried out. The circuit expenditure of such FIR filters is however rather substantial, so that the utilization of an IIR (Infinite Impulse Response) filter in combination with an FIR filter is proposed, (as for example in European Patent Publication EP-0 384 490). As per this known teaching, the circuit expenditure for adaptive filter AF can be reduced significantly. Such proposed cascading however is problematic, particularly with reference to its adaptive behavior. Orthogonal filter structures, such as adaptive filters AF, illustrated in FIG. 5 are much more useful.

As noted, the estimated echo signal Y, in accordance with the invention is divided into a first portion Y_MSB and a second portion Y_LSB. First portion Y_MSB of estimated echo signal Y is transmitted to first digital/analog converter DAC for pre-compensation thereof, that is the largest echo portion is compensated via first adder ADD1 upstream of analog/digital converter ADC. As a result thereof, the dynamics of the analog/digital converter ADC and therewith also the circuit expenditures required therefore are substantially reduced. In order to cover the entire entry range or dynamic area of analog/digital converter ADC, the output signal of first adder ADD1 is amplified or decreased with the aid of adjustable amplifier AGC.

The second portion Y_LSB of estimated echo signal Y is compensated, in the usual manner, with the aid of second adder ADD2, in the digital portion of the received path, that is an actual fine compensation or tuning of the echo signal takes place in second adder ADD2.

If, for example, a width of 6 bits is provided for the analog pre-compensation of first portion Y_MSB of estimated echo signal Y, then a first digital/analog converter DAC of 6 bits is required. As already set forth in the teachings, relative to European Patent Application EP-0 464 500, for the compensation of echo signals having a 14 bit accuracy, a digital/analog converter DAC, of this accuracy is also required. This means that the linearity of digital/analog converter DAC must be 14 bits, even though the resolution is but 6 bits. In order to operate with a linearity of 6 bits, the circuit arrangement of this invention, as per FIG. 3, utilizes a non-linear compensation filter TLU. Therewith, the high circuit expenditure of an exact first digital/analog converter DAC can be avoided.

Compensation filter TLU stores, for each step of first digital/analog converter DAC a corresponding value of compensation signal YD, which is transmitted, on the digital side, to adder ADD3. Therewith, all possible non-idealities (for example, non-linearities and amplification errors) of the entire analog echo compensation path, consisting of digital/analog converter DAC, first adder ADD1 and analog/digital converter ADC, can be compensated.

With an accuracy of 16 bits for estimated echo signal Y, a width of 10 bits is required for compensation signal YD at digital/analog converter DAC having a typical 6 bit linearity. This results in a memory requirement of $10*2^6=640$ bits for compensation filter TLU. For the adaptive production of compensation values, reference should be made to the article by N. Holte and S. Stueflotten, entitled "A new digital echo canceler for two-wire subscriber lines" published in IEEE Trans. on Communications, 29(11), pages 1573 to 1581, November 1981.

There is now the particular advantageous possibility of using digital/analog converters which have a small resolution and mostly large non-linearities, since occurring quantitative errors and distortions as a result of the non-linearities can be eliminated with the aid of compensation filter TLU.

A further embodiment of this invention utilizes a compensation filter TLU via which the dynamic non-linearities of the first digital/analog converter DAC are also eliminated. The term "dynamic non-linearities" is to be understood hereinafter as a dependency of the output value of the digital/analog converter DAC upon several input values. Mathematically it can be expressed as follows:

$$v_j = f(u_{j-1}, \ldots, u_{j-1}, \ldots, u_{j-n}) \text{ for } i=1 \text{ to } n$$

wherein $v_j$ represents the output signal of the digital/analog converter DAC at a moment of time j, with $u_{j-1}, \ldots, u_{j-n}$ representing the last input signals of digital/analog converter DAC and with f( ) representing the non-linear transmission function of digital/analog converter DAC.

Hereinafter, the effects of the dynamic non-linearities will be explained with reference to a simple example. The input signal of the digital/analog converter DAC changes from a value of 10 to the value 20. The value that is formed, after this transition, at the output of digital/analog converter DAC, distinguishes itself from the one that changes, after a transition, from an input value of 15 to the value of 20. Even though the second input value is the same in both instances, namely 20, the same value is not formed at the output of digital/analog converter DAC. The cause of this difference in the output signals of digital/analog converter DAC lies in the presence of a dynamic non-linearity which is corrected, in accordance with the invention, in that the instantaneous value at the inlet of digital/analog converter DAC as well as the preceding value are considered at the generation of the output signal of digital/analog converter DAC. Corresponding to the above noted general mathematical formula, any desired number of prior input signal values of digital/analog converter DAC, can be considered at the formation of its output signal. An increasing number of considered prior input signal values decreases the error resulting from the dynamic non-linearity. However, with an increasing consideration of input signal values, the storage capacity of compensation filter TLU increases exponentially.

This is particularly undesirable with the integration of the entire circuit of the transmission network TU onto a chip. It has however been determined that the consideration of the instantaneous and the immediately prior input signal values are sufficient for the substantial compensation of the errors produced via dynamic non-linearities. In addition, it has been determined that not the entire byte or word width of the immediately prior input signal value must necessarily be utilized, so that the required storage capacity in compensation filter TLU can thus be reduced.

It is assumed that the byte or word width of the first portion Y_MSB of the estimated echo signal is five bits, thus the address region or range of the storage in compensation filter TLU is comprised, for example, of seven bits, namely of five bits of the instantaneous and of two bits of the previous input signal values of digital/analog converter DAC. For the selection of the two bits of the previous input signal value there are two basic possibilities for the determination thereof: Either the two highest value bits of the previous input signal value are used directly or the two highest value bits of the calculated difference between the previous and the instantaneous input signal value, that is $u_{j-2} - u_{j-1}$ are utilized.

The address region or range of seven bits, in the previously noted example, requires a storage or memory capacity of $2^7 = 128$ storage allocations for the correction of the dynamic non-linearities. The additional expenditure for the necessary storage allocations for the correction of the dynamic non-linearities is minor compared to the expenditure for the necessary $2^5 = 32$ storage allocations for the correction of static non-linearities alone. The advantage for the analog portion of transmission network TU, via the use of the previously described correction of dynamic non-linearities, is however considerable, since viewed from the dynamic standpoint, instead of a 13 bit digital/analog converter DAC only an 8 bit digital/analog converter DAC is necessary. Herewith, the circuit expense can be substantially reduced since, particularly with the integration of analog circuits with high requirements with reference to dynamic accuracy, the circuit expense increases appreciably.

In a further embodiment of the invention, particularly with the implementation of transmission network TU on a chip as a so-called integrated circuit, the address region or range of the memory or storage of compensation filter TLU is comprised of the first portion Y_MSB of the estimated echo signal Y as per the previously noted possibilities and additionally of the values of send signal SS, of which as already used in first portion Y_MSB, as well an instantaneously occurring value $s_{j-1}$ of send signal SS and also the previous values $s_{j-2}$ to $s_{j-m}$ thereof, can be used for addressing, wherein m corresponds to the number of the considered values. At the same time, it is planned that values $s_{j-1}$ to $s_{j-m}$ of send signal SS be used directly or that their differences, for example, $s_{j-2} - s_{j-1}$ be utilized for addressing the memory of compensation filter TLU. The reason for this address range increase is a performance-mitigating mutual dependency of the output signals of both digital/analog converters DA and DAC. Since they are both disposed on the same substrate, a relatively large output signal change of second digital/analog converter DA, particularly influences the output signal of first digital/analog converter DAC, even though otherwise the first portion Y_MSB of estimated echo signal Y and send signal SS, at point of time j, are uncorrelated.

Via the previously noted address range or region increase, the size of the memory of compensation filter TLU is increased accordingly. This basically undesired development can, for example, be thus avoided in that, of the initially planned six bits of first portion Y_MSB of estimated echo signal Y, only a portion thereof, for example the four highest value bits, are utilized for addressing.

The word or byte widths of the input signals of the previously noted embodiments can of course be of differing magnitude without changing the character of the invention.

FIGS. 4 to 7 show further working embodiments of the transmission network TU, wherein these differ only inconsequentially from the circuit arrangement illustrated in FIG. 3.

Figure 4:
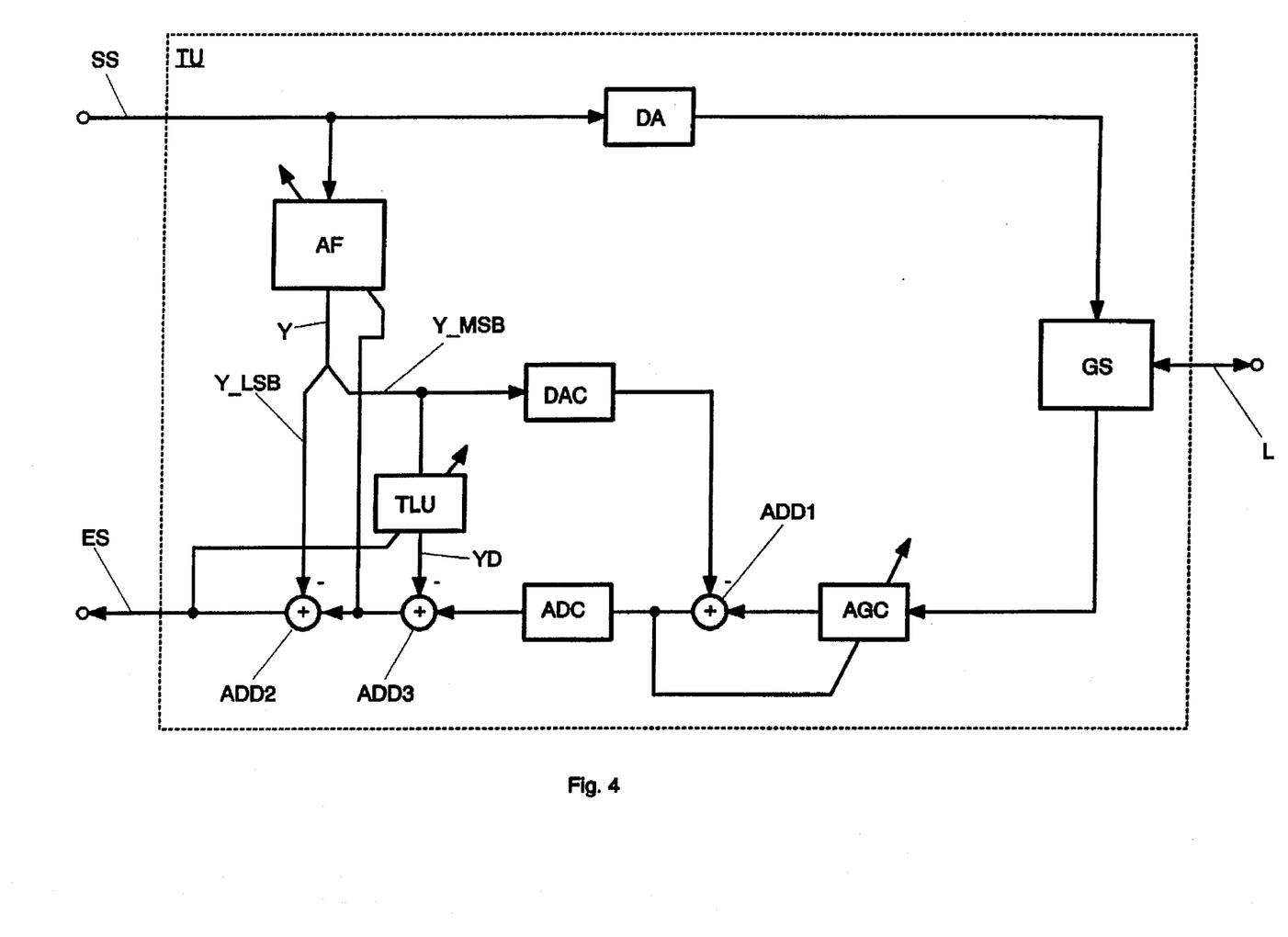
FIGS. 4–8 are further embodiments of the echo canceler of FIG. 3.

FIG. 4 shows the same circuit arrangement as FIG. 3 with the difference that the coefficients of adaptive filter AF, as a result of the output signal of the third adder ADD3, are adapted in place of the second adder ADD2. The coefficients of the compensation filter TLU, are set, as in the solution illustrated in FIG. 3, as a result of the received signal ES.

FIG. 5 also shows the same circuit arrangement as FIG. 3, however the coefficients of the compensation filter TLU, as a result of the output signal of the third adder ADD3, are adapted in place of the second adder ADD2. The coefficients of the adaptive filter AF are adapted, as is the case in the circuit arrangement of FIG. 3, as a result of the received signal ES.

Figure 6:
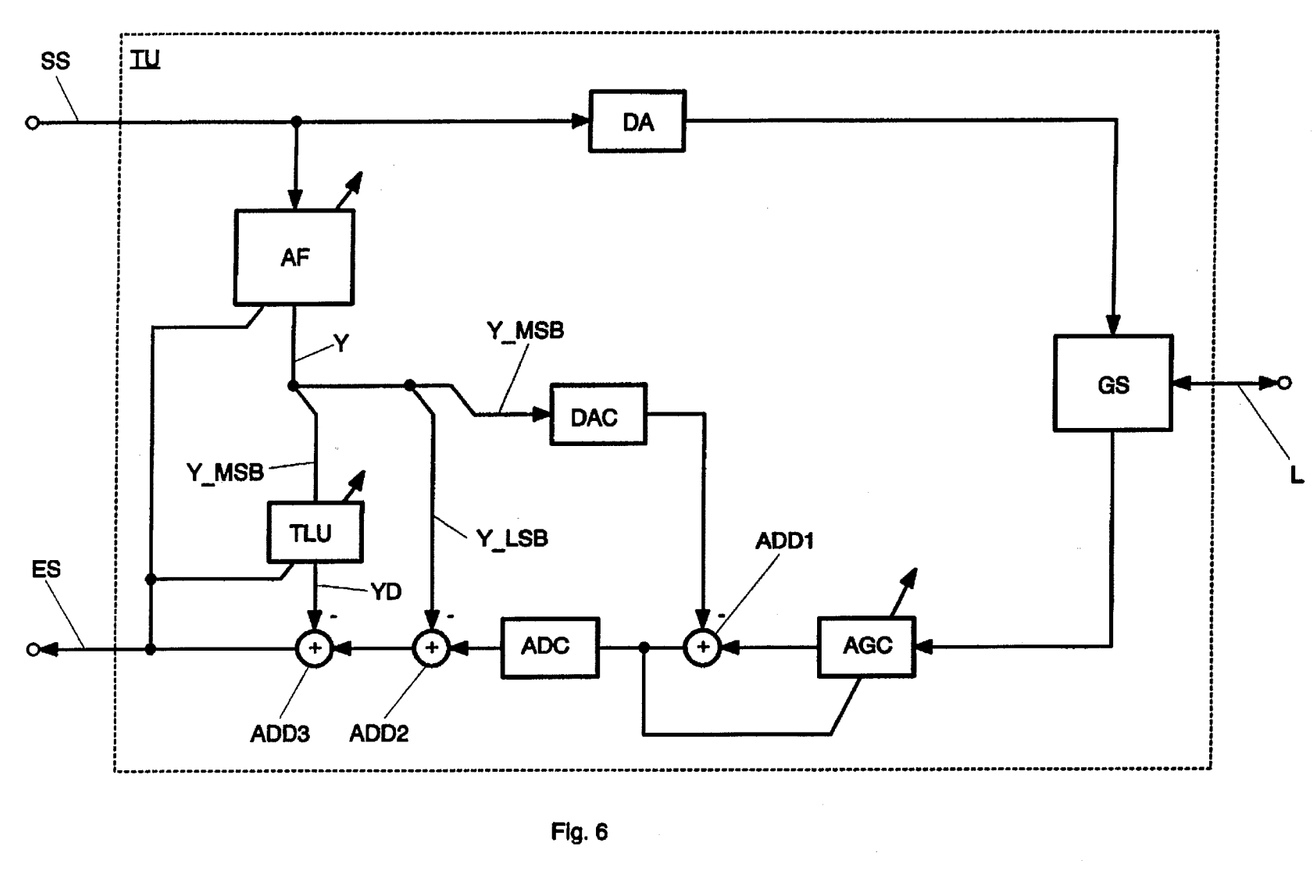

FIG. 6 shows a further circuit arrangement, wherein also the coefficients of the adaptive filter AF as well as these of the compensation filter TLU are adapted as a result of the received signal ES. Different however is the sequence of the adders ADD2 and ADD3 in the received path. Following the analog/digital converter ADC is the second adder ADD2 via which the fine compensation of echo signal Y is carried out.

Following adder ADD2, viewed in the direction of transmission, is third adder ADD3 whose second input is connected with the outlet of compensation filter TLU. The remaining structure of the circuit arrangement of FIG. 6, as well as the adaptation algorithm thereof, differ only inconsequentially with reference to those of FIG. 3.

Figure 7:
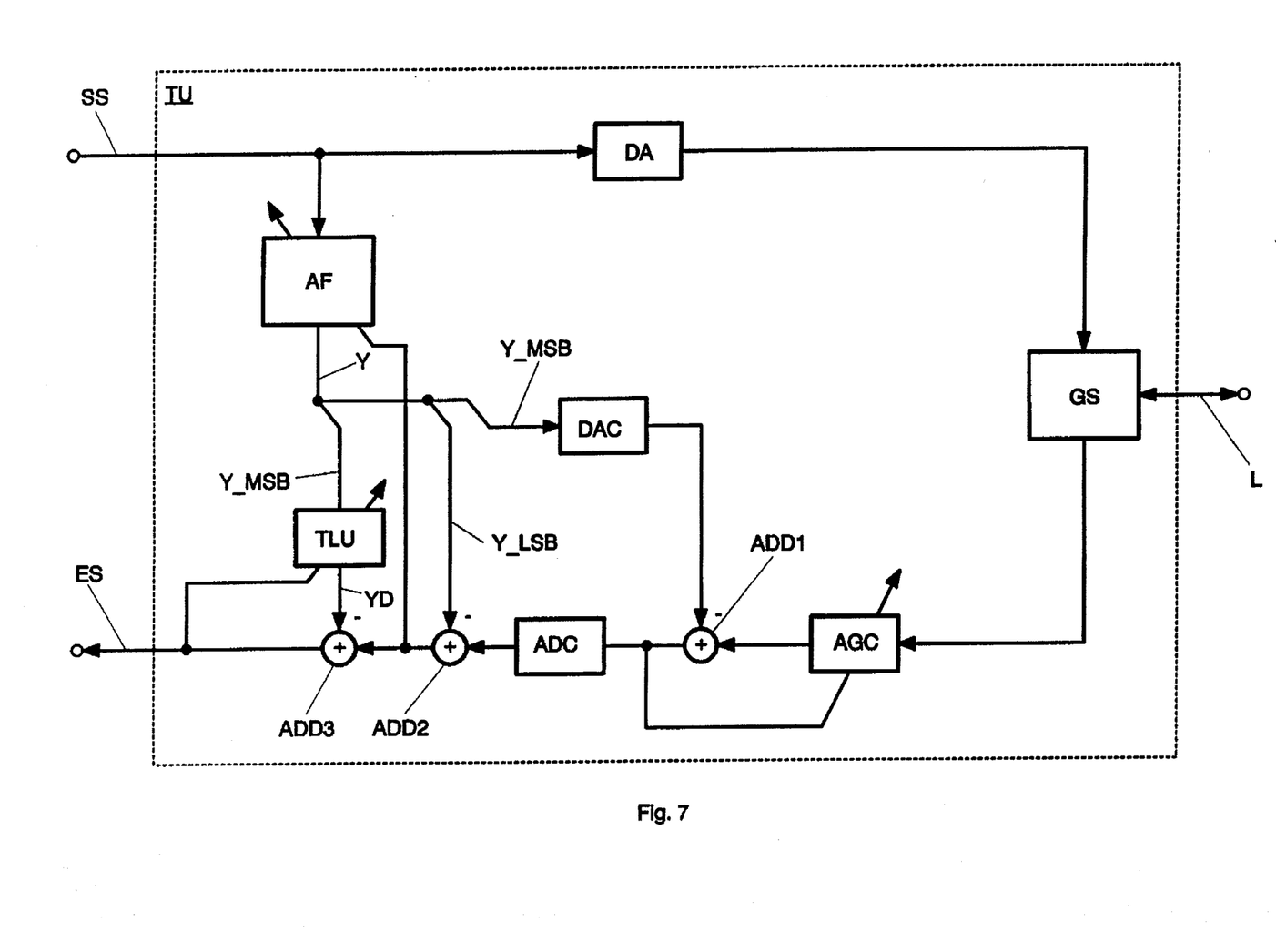

Finally, FIG. 7 shows the same circuit arrangement as that of FIG. 6, however the coefficients of the adaptive filter AF, as a result of the output signal of the second adder ADD2, are adapted in place of the third adder ADD3 or of the received signal ES. The coefficients of the compensation filter TLU are adapted, as is the case in the circuit arrangement of FIG. 3, as a result of the received signal ES.

In order to permit the phasing in of adaptive filter AF and of compensation filter TLU and to assure that adaptive filter AF is optimally adjusted in the phased-in condition, the following measures are necessary: Adjustable amplifier AGC cannot have any desired amplification, but rather must be held within an amplification region that is bounded via a minimal and a maximum amplification and has a set reference size, which, for example, can be compared with the instantaneous power or performance of the input signal of analog/digital converter ADC and which must be so adjusted or set that the input signal of analog/digital converter ADC is not limited in its input region or range. In addition, the minimal amplification must be so limited, that the largest amplitude of the echo signal amplified with this minimal amplification, is at least greater than a factor of two than the smallest potential that can be produced in a first digital/analog converter DAC. The maximum amplification of adjustable amplifier AGC, on the other hand, must be so limited that the maximum amplitude of the echo signal, in the received path, amplified with this maximum amplification, is smaller than the maximum analog potential that the first digital/analog converter DAC can produce.

Figure 8:
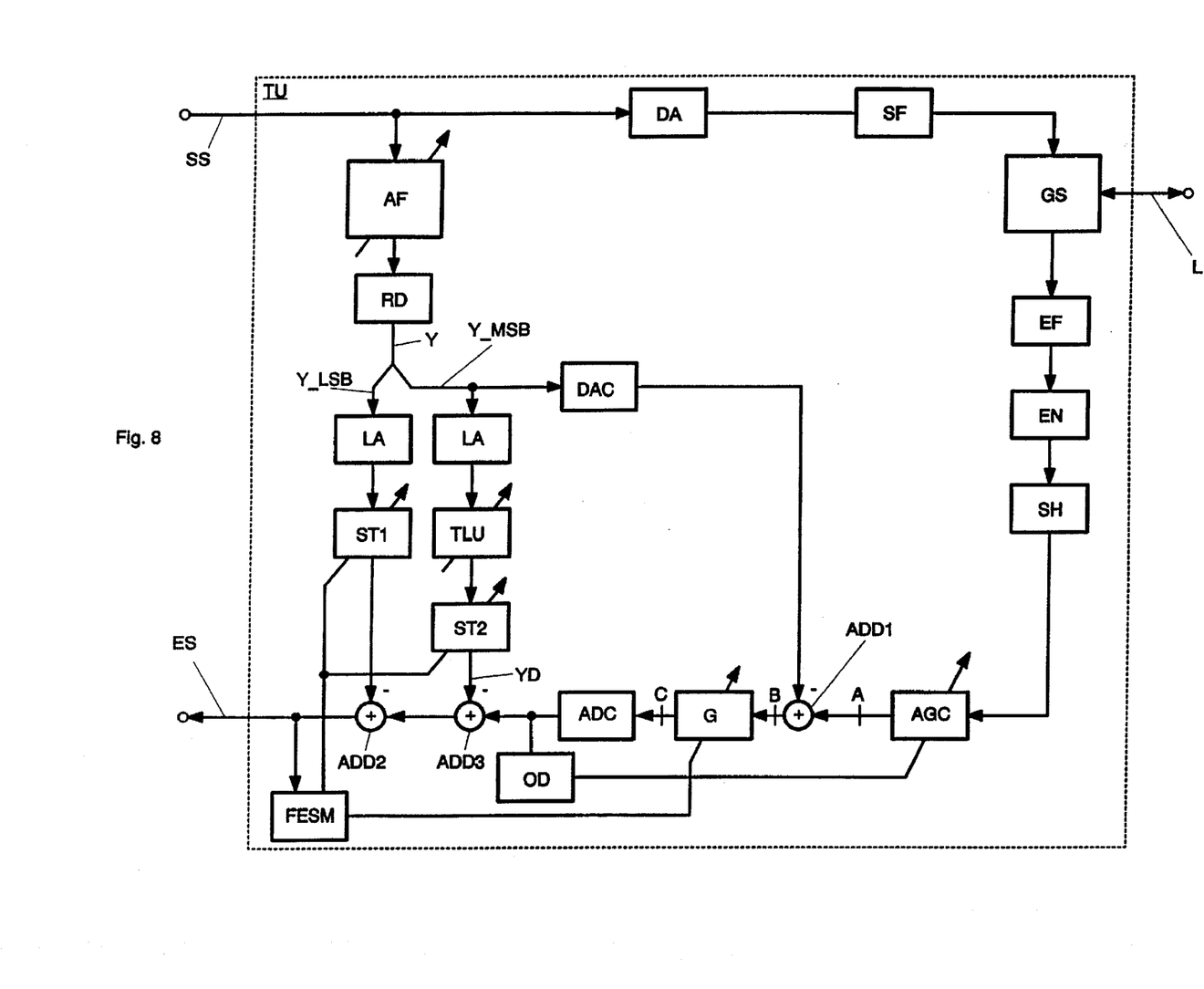

FIG. 8 illustrates a further embodiment of transmission network TU which particularly distinguishes itself via an automatic adaptation for differing line lengths of two wire line L that is connected with transmission unit GS. For that reason, a received signal measuring unit FESM, an amplifier unit G, and a bit shift unit ST1 are provided, wherein the received signal measuring unit FESM monitors the signal region of received signal ES, so that as a result of the obtained information, the amplifier unit G as well as also the bit shift unit ST1 can be so controlled that the entire dynamic region of analog/digital converter ADC can be utilized. While amplifier unit G is preferably located between first adder ADD1 and analog/digital converter ADC in the received path, bit shift unit ST1 is located, in the first portion Y_MSB of the signal path that carries (hereinafter referred to as digital compensation path) estimated echo signal Y, preferably ahead or upstream of second adder ADD2. The functioning thereof will be described hereinafter in detail with reference to FIG. 9

In the compensation path, located upstream of bit shift unit ST1, when viewed in the signal transmission direction, is a transit time phasing unit LA via which differing signal transit times are equalized or balanced between the analog and digital compensation paths. Differing operating or transit time occur particularly via signal delays at first analog adder ADD1 and at analog/digital converter ADC. As a result thereof and in a corresponding manner, a transit time phasing unit LA is provided in a further digital compensation path, comprised of compensation filter TLU and third adder ADD3, which is preferably located, when viewed in the signal transmission direction, ahead or upstream of compensation filter TLU and which in this signal path also equalizes or balances the differing signal transit times between the analog and digital compensation paths.

The embodiment of the invention illustrated in FIG. 8 also includes a further bit shift unit ST2 in the further compensation path that also includes compensation filter TLU which, like bit shift unit ST1, is also controlled by received signal measuring unit FESM is a matter to be described hereinafter. Via this further optional bit shift unit ST2, the phasing-in procedure of the entire system is substantially reduced.

With reference to the transmission networks TU illustrated in FIGS. 3–7, the transmission network illustrated in FIG. 8 differs in that additionally a rounding unit RD, a send filter SF, a received filter EF, a precompensator EN, a sample and hold element SH and a detector OD are provided, wherein the rounding unit RD is located between adaptive filter AF and the signal branching of estimated echo signal Y and wherein send filter SF is located between digital/analog converter DA and transmission unit GS. In addition, the received filter EF, the precompensator EN and the sample and hold element SH are switched in series between the transmission unit GS and the adjustable amplifier AGC. Finally, detector CO is provided for the monitoring of the range of modulation of the analog/digital converter ADC, so that therewith the adjustable amplifier AGC can be set or adjusted for the optimum utilization of the input region or range of the analog/digital converter ADC.

The rounding unit RD is used for the reduction of the signal width of the echo signal that is estimated with the aid of adaptive filter AF for the reduction of the circuit costs, wherein at a resolution of 24 bits for the output signal of adaptive filter AF preferably only the 10 highest value bits are subjected to subsequent treatment, since processing expense for all 24 bits, on one side, is greater, but does not lead to substantial improvement of the echo compensation. For this reason, the output signal of adaptive filter AF, with the aid of rounding unit RD is reduced to the 13 highest value bits via the rounding thereof. The remaining 13 bits for estimated echo signal Y are divided into first portion Y_LSB with 8 bits and into second portion Y_MSB with 5 bits.

As already noted, send filter SF is provided in the send path after digital/analog converter DA, with send filter SF being utilized for editing of the signal to be sent, in the manner, which for example is particularly described in priority Swiss Patent Application 2298/94-8. In the received path in a suitable manner, with the aid of received filter EF, precompensator EN and sample and hold element SH, the received signal is edited for the further processing, particularly for the subsequent analog/digital conversion.

Send filter SF, receiver filter EF, precompensator EN, sample and hold element SH and rounding unit RD can, of course, be used singly, or in combination with each other, also in the transmission network TU illustrated in FIGS. 3 to 7. Correspondingly, for the generation of the necessary reference signals at adaptive filter AF and at compensation filter TLU, signals can be picked up at the places illustrated in the transmission networks of FIGS. 3 to 7.

Figure 9A:
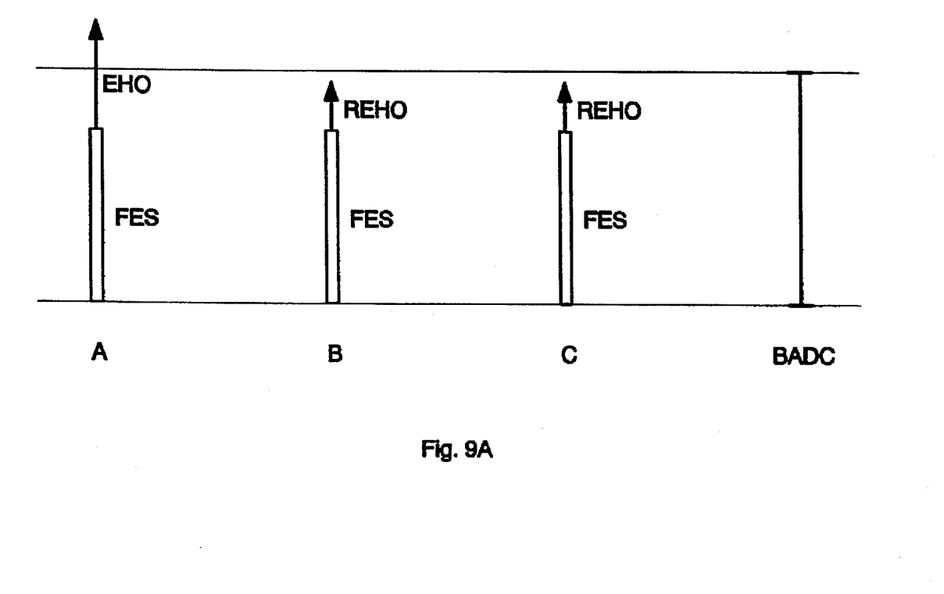
FIGS. 9A and 9B are amplitude proportions in the received path of the transmission network of FIG. 8.
Figure 9B:
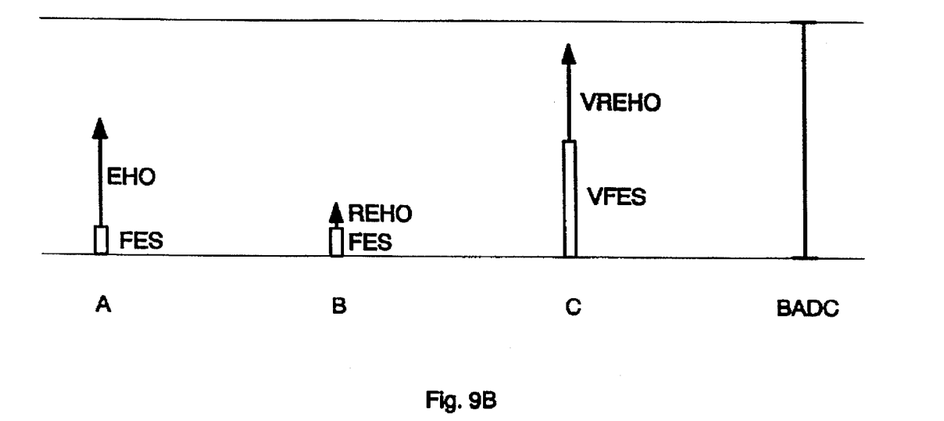

FIGS. 9A and 9B illustrate the amplitude relationships of signal portions at reference points A, B and C (FIG. 8) in the received path of transmission network TU, wherein reference point A is located ahead of first adder ADD1, reference B is located ahead of amplifier unit G and reference point C is located ahead of analog/digital converter ADC. In the interest of simplicity, it is assumed that no adjustable amplifier AGC is provided, that is that its gain corresponds to one. As noted, received signal measuring unit FESM monitors the received signal ES (FIG. 8) and checks if the input region or range of analog/digital converter ADC is fully utilized or if need be, via changes in the gain in amplifier unit G, that is if a bit shift in bit shift units ST1 and ST2—which which also causes a signal amplification or weakening—should be undertaken. In this instance it must however be noted that the two or three amplification constants or gains are of the same size. This is achieved in that at one bit shift of n places in bit shift units ST1 ST2, there is a gain of $2^n$ in amplifier unit G. Therewith, the signal integrity of transmission network TU, particularly between the analog and the digital compensation paths, is maintained. A substantial advantage that results therefrom is an automatic adaptation of transmission network TU relative to differing lengths of two wire line L. This will be explained in more detail with reference to FIG. 9A and 9B, wherein FIG. 9A starts with a short two wire line L with a correspondingly large useful signal FES while FIG. 9B starts with a long two wire line L with a correspondingly small useful signal FES. In both illustrated instances the echo signal portion EHO is of the same size, wherein the useful signal FES, in correspondence with the line length, is more or less weakened.

FIG. 9A illustrates the maximum amplitude of useful signal FES, overlaid or superimposed with echo signal portion EHO, at reference points A, B and C with reference input or entry region BADC of analog/digital converter ADC (FIG. 8). At reference point A, the total signal that is comprised of useful signal FES and echo signal portion EHO can be greater than entry region BADC. It is however alterable that, subsequent to the analog precompensation in first adder ADD1, the total signal is smaller at reference point B than at input region BADC, so that the analog/digital converter ADC is not overloaded or distorted. The total signal at reference point B is thus comprised of original useful signal FES together with echo remainder signal REHO. In the situation illustrated in FIG. 9A, the gain of amplifier unit G corresponds to one, that being the reason why the same total signal is available at reference point C.

It should be noted at this time that the entire or total signal at reference point C should always be so large that the total signal at reference point B, that is after the analog precompensation, is just smaller than input region BADC. If this is not the case, this situation can also be achieved via changes in the gain factor of adjustable amplifier AGC.

FIG. 9B, in opposition to the situation illustrated in FIG. 9A, starts with a long length of two wire line L. As a result thereof, useful signal FES is correspondingly smaller. In opposition to the situation illustrated in FIG. 9A, the echo signal portion EHO is initially taken to be large, so that the total signal is correspondingly smaller. At reference point B, the total signal is merely comprised of the original useful signal FES and the echo signal remainder portion REHO. In order to be able to utilize the entire entry region or range BADC of analog/digital converter ADC, the total signal that is available at reference point B is so amplified in amplifier G that the entire region BADC is again utilized. Therein, however the compensation signal that was provided in the compensation path must also be amplified accordingly.

This is accomplished, as noted, via bit shifting in bit shift unit 1 and, if available, also in bit shift unit ST2.

At reference point C, as a result thereof, a total signal is at hand, that is comprised of an amplified echo signal remainder portion VREHO and amplified useful signal VFES.

As already noted, one of the known filter structures (FIR or FIR, in combination with an IIR filter) can be utilized for adaptive filter AF (FIG. 1–8). However, particularly advantageous for the adaptation is the filter structure, for adaptive filter AF set forth in FIG. 10.

Figure 10:
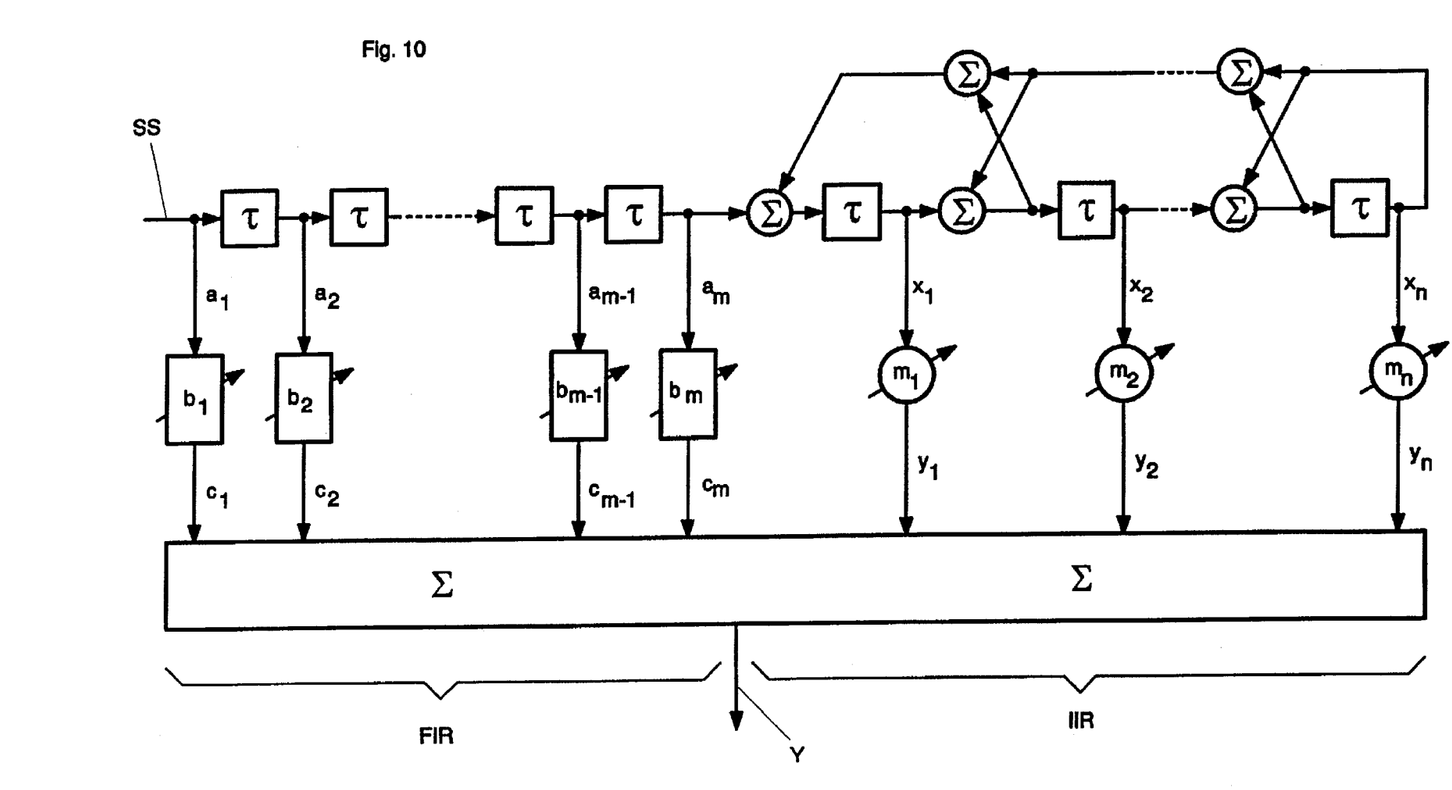
FIG. 10 is an adaptive filter, comprised of an IIR and an FIR filter portion, utilized in an echo canceler.

The filter AF, illustrated in FIG. 10 includes, in addition to an FIR filter portion, an IIR filter portion which is preferable realized in an "inverse lattice" structure. Of importance therein is that not only the FIR filter conditions $a_1$, to $a_m$, but also that the IIR-filter conditions $x_1$, to $x_n$ are not correlated.

The FIR filter portion is comprised of series of switched digit delay elements of τ, coefficient elements $b_1$ to $b_m$ and an adder Σ. The input signal of adaptive filter AF as well as also the FIR filter portion of send signal SS which, on one side, is transmitted to series-switched digit delay element τ and, on the other side, transmitted to first coefficient element $b_1$. Further coefficient elements $b_2$ to $b_m$ are arranged in the same manner, wherein the input signals thereof are removed between the subsequent digit delay elements Σ and whose output signals are summed in adder Σ. In this adder Σ, the output signals of the IIR filter portion are also summed for the estimated echo signal Y. The poles of the IIR filter for stability reasons, are not changed during operation. They are optimally adapted to the existing system surroundings with the process set forth by A. Kaelin et. al. in an article entitled "Linear Echo Cancellation Using Optimized Recursive Prefiltering", Proc. IEEE Int. Symp. on Circuits and Systems, Chicago, pages 463 to 466, 1993.

The FIR-filter portion and its adaptation is realized or implemented in accordance with the invention in the manner of the storage or memory balance method, in order to substantially permit the correction of image distortion of digital/analog converter DA (FIGS. 3 and 4). Therefore, each time, both bits of the tetravalent conditions $a_m$ to $a_m$ serve as the address of a memory having four memory cells. In each of the cells, the output values are adaptively formed. Reference should be made to N. Holte and S. Stueflotten, "A new digital echo canceler for two-wire subscriber lines", published in IEEE Trans. on Communications, 29(11), Pages 1573 to 1581, November 1981. In this manner, an FIR filter with twenty taps and twenty memories, having four memory cells each, are required. The storage capacity thus for 16 bit wide memory cells require 20*4*16=1280 bits.

It should be expressly understood, that any desired allocation of the memory is useable relative to conditions $a_1$ to $a_m$. For example, even a single memory with but one address region which is formed of all bits of conditions $a_t$ to $a_m$ is feasible. In this case however, the storage requirement becomes unrealistically large, for example $4^{20}*16=1.76*10^{13}$ bits for an FIR-filter with twenty taps.

As already noted, tetravalent send signal, corresponding to the 2B1Q encoding (FIGS. 1 to 8) must be converted into an analog signal which, for example is sufficient or compatible with the specification set forth in ETSI (European Telecommunications Standards Institute). Known HDSL transmitters form this send signal already on the digital side that is upstream of second digital/analog converter DA, in which, for example, a further digital filter is utilized. An analog filter, typically of the second to fifth order, is however still required for smoothing the pulse form between the digital/analog converter DA and transmission unit GA (FIGS. 1 and 2). A notable disadvantage of such a built up send or emitting path is due to the requirements of the digital/analog converter DA. Converter DA must initially have a conversion that is a multiple of the symbol rate. In addition, increased requirements are also necessary relative to the resolution and linearity of the digital/analog converter DA in order that the desired analog send signal is produced as accurately as possible.

In order to reduce the requirements of the digital/analog converter DA and to achieve a further reduction of the circuit expenditure, in accordance with the invention, an analog send filter is interposed between digital/analog converter DA and transmission unit GS. This send filter converts the square pulses in the height −3, −1, +1 or +3, produced by digital/analog converter DA, into an exactly desired pulse form. For this, the poles and zeros of the transmission function of the send filter are determined in an appropriate process. Standard filters, such as the known Chebyshev or Butterworth filters are not suitable as the exit position of the send filter since the zeros of the filters are fixed in infinity. Nevertheless, the expense for an optimum send filter, obtained via a systems identification process is practically identical with that of a standard filter utilized as a smoothing filter. This can also be recognized from the following transmission function T(s), which was optimized with reference to a symbol rate of 292 symbols/s:

$$T(s) = T_1(s) * T_2(s)$$

wherein $$T_1(s) = 0.3940 * \frac{s^2 + 1.1834*10^6*s + 2.4134*10^{13}}{s^2 + 4.9598*10^6*s + 1.3263*10^{13}}$$

and $$T_2(s) = \frac{1}{0.3940} * \frac{6.1007*10^{12}}{s^2 + 5.2757*10^6*s + 1.1154*10^{13}}$$

If for the realization of the transmission function T(s) the SC (Switched Capacitor) technology is utilized, the circuits arrangement or connection method need not be changed upon changing upon the symbol rate. The absence of programmability which this analog filter has, with reference to a digital filter, in no way limits the utility thereof in any way.

Since the smoothing and the pulse function is, in accordance with the invention, accomplished via the same send filter, a single digital/analog converter DA with a two bit resolution and a conversion rate, that match the symbol rate, is sufficient. The four steps resulting from the two bits can be very inexact since this type of non-linearity can be corrected via the FIR portion of adaptation filter AF (FIGS. 3 to 8), described with reference to FIG. 10.

Finally, it should be specifically noted that the circuit arrangement of this invention can be successfully utilized not only for HDSL data transfer. Rather, the circuit arrangement is also usable for other transmission types for the compensation of echo signal portions.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A circuit arrangement comprising:
   a send path carrying a send signal;
   a receiving path carrying a received signal;
   an adaptive filter;
   an analog first adder;
   a first digital/analog converter;
   a transmission unit; and
   a two line wire attached to the transmission unit,
   wherein over the two line wire at least the send signal, the received signal and echo signal portions are transmitted, the send path and the received path are connected with the transmission unit and the send signal is transmitted to the adaptive filter for providing an estimated echo signal, the estimated echo signal transmitted through the first digital/analog converter to the first analog adder, located in the received path, for the reduction of an echo signal portion in the received signal,
   wherein the first adder, viewed in a direction of transmission, is followed by an analog/digital converter and then by a digital second adder, and a first portion of the estimated echo signal being transmitted to the first adder and a second portion of the estimated echo signal being transmitted to the second adder, for the production of the received signal,
   wherein means for full utilization of the dynamic range are provided for the analog/digital converter and therefore for the automatic adaptation to differing lengths of the two line wire,
   the means for full adaptation to differing line lengths comprising:
   a bit shift unit;
   an amplifier unit; and
   a received signal measuring unit, the bit shift unit being provided upstream of the second adder in the signal transmission direction; the amplifier unit being provided between the first adder and the analog/digital converter and the received signal measuring unit impressed with the received signal for the control of the bit shift unit and the amplifier unit.

2. The circuit arrangement of claim 1, wherein the means for the adaptation onto differing line lengths are comprised of an adjustable amplifier and a detector, wherein the adjustable amplifier, viewed in the signal transmission direction, being provided upstream of the first adder and the detector is impressed with the output signal of the analog/digital converter for the control of the adjustable amplifier.

3. The circuit arrangement of claim 1, wherein a digital third adder is provided between the analog/digital converter and wherein the second adder is provided in the received path, and wherein means are provided for the compensation of non-idealities of the analog/digital converter, the first adder, the digital/analog converter and wherein additional signal processing units are located between the first portion of the estimated echo signal and the third adder, wherein said means for the compensation of non-idealities of the analog/digital converter are impacted by the first portion of the estimated echo signal, as a result of which a compensation signal is produced, with said compensation signal being subtracted by the third adder from the signal in the received path.

4. The circuit arrangement of claim 1, wherein a digital third adder is switched, when viewed in the direction of transmission, after the second adder; and wherein means are provided for the compensation of the non-idealities of the analog/digital converter, the first adder, the digital/analog converter and wherein additional signal processing units are located between the first portion of the estimated echo signal and the third adder, wherein said means provided for the compensation of the non-idealities of the analog/digital converter are impacted by the first portion of the estimated echo signal, as a result of which a compensation signal is produced, with said compensation signal being subtracted by the third adder from the signal in the received path.

5. The circuit arrangement of claim 1, wherein the adaptive filter is comprised of at least one of a FIR (Finite Impulse Response) filter portion (FIR) and an IIR (Infinite Impulse Response) filter portion (IIR), wherein the FIR filter portion is of the storage compensation type.

6. A circuit arrangement comprising:
   a send path carrying a send signal;
   a receiving path carrying a received signal;
   an adaptive filter;
   an analog first adder;
   a first digital/analog converter;
   a transmission unit; and
   a two line wire attached to the transmission unit,
   wherein over the two line wire at least the send signal, the received signal and echo signal portions are transmitted, the send path and the received path are connected with the transmission unit and the send signal is transmitted to the adaptive filter for providing an estimated echo signal, the estimated echo signal transmitted through the first digital/analog converter to the first analog adder, located in the received path, for the reduction of an echo signal portion in the received signal,
   wherein the first adder, viewed in a direction of transmission, is followed by an analog/digital converter and then by a digital second adder, and a first portion of the estimated echo signal being transmitted to the first adder and a second portion of the estimated echo signal being transmitted to the second adder, for the production of the received signal,
   wherein means for full utilization of the dynamic range are provided for the analog/digital converter and therefore for the automatic adaptation to differing lengths of the two line wire
   the means for adaptation onto differing line lengths comprising an adjustable amplifier and a detector,
   the adjustable amplifier, viewed in a signal transmission direction, is provided upstream of the first adder and the detector is impressed with the output signal of the analog/digital converter for the control of the adjustable amplifier.

7. The circuit arrangement of claim 6, wherein a digital third adder is provided between the analog/digital converter and wherein the second adder is provided in the received path, and wherein means are provided for the compensation of non-idealities of the analog/digital converter, the first adder, the digital/analog converter and wherein additional signal processing units are located between the first portion of the estimated echo signal and the third adder, wherein said means for the compensation of non-idealities of the analog/digital converter are impacted by the first portion of the estimated echo signal, as a result of which a compensation signal is produced, with said compensation signal being subtracted by the third adder from the signal in the received path.

8. The circuit arrangement of claim 6, wherein a digital third adder is switched, when viewed in the direction of transmission, after the second adder; and wherein means are provided for the compensation of the non-idealities of the analog/digital converter, the first adder, the digital/analog converter and wherein additional signal processing units are located between the first portion of the estimated echo signal and the third adder, wherein said means provided for the compensation of the non-idealities of the analog/digital converter are impacted by the first portion of the estimated echo signal, as a result of which a compensation signal is produced, with said compensation signal being subtracted by the third adder from the signal in the received path.

9. The circuit arrangement of claim 6, wherein the adaptive filter is comprised of at least one of a FIR (Finite Impulse Response) filter portion (FIR) and an IIR (Infinite Impulse Response) filter portion (IIR), wherein the FIR filter portion is of the storage compensation type.

10. A circuit arrangement comprising:
    a send path carrying a send signal;
    a receiving path carrying a received signal;
    an adaptive filter;
    an analog first adder;
    a first digital/analog converter;
    a transmission unit; and
    a two line wire attached to the transmission unit,
    wherein over the two line wire at least the send signal, the received signal and echo signal portions are transmitted, the send path and the received path are connected with the transmission unit and the send signal is transmitted to the adaptive filter for providing an estimated echo signal, the estimated echo signal transmitted through the first digital/analog converter to the first analog adder, located in the received path, for the reduction of an echo signal portion in the received signal,
    wherein the first adder, viewed in a direction of transmission, is followed by an analog/digital converter and then by a digital second adder, and a first portion of the estimated echo signal being transmitted to the first adder and a second portion of the estimated echo signal being transmitted to the second adder, for the production of the received signal,
    the adaptive filter comprising at least one of a FIR (Finite Impulse Response) filter portion (FIR) and an IIR (Infinite Impulse Response) filter portion (IIR), the FIR filter portion of the storage compensation type,
    a second digital/analog converter and a send signal filter provided in the send path, with the send signal filter being input-connected with the digital/analog converter and output-connected with the transmission unit, the digital/analog converter impressed with the send signal,
    the send signal filter produces a predetermined pulse form at the outlet of the send filter, and
    the send filter has a transfer function $T(s)=T_1(s)*T_2(s,)$ wherein:

$$T_1(s) = 0.3940 * \frac{s^2 + 1.1834*10^6*s + 2.4134*10^{13}}{s^2 + 4.9598*10^6*s + 1.3263*10^{13}}$$

and $$T_2(s) = \frac{1}{0.3940} * \frac{6.1007*10^{12}}{s^2 + 5.2757*10^6*s + 1.1154*10^{13}}.$$

11. The signal circuit of claim 10, wherein characteristic pole positions, corresponding to the transmission characteristics of the two wire line, are fixed for the IIR filter portion.

12. A circuit arrangement comprising:
    a send path carrying a send signal;
    a receiving path carrying a received signal;
    an adaptive filter;
    an analog first adder;
    a first digital/analog converter;
    a transmission unit; and
    a two line wire attached to the transmission unit,
    wherein over the two line wire at least the send signal, the received signal and echo signal portions are transmitted, the send path and the received path are connected with the transmission unit and the send signal is transmitted to the adaptive filter for providing an estimated echo signal, the estimated echo signal transmitted through the first digital/analog converter to the first analog adder, located in the received path, for the reduction of an echo signal portion in the received signal, wherein the first adder, viewed in a direction of transmission, is followed by an analog/digital converter and then by a digital second adder, and a first portion of the estimated echo signal being transmitted to the first adder and a second portion of the estimated echo signal being transmitted to the second adder, for the production of the received signal the adaptive filter comprising at least one of a FIR (Finite Impulse Response) filter portion (FIR) and an IIR (Infinite Impulse Response) filter portion (IIR), the FIR filter portion of the storage compensation type, a second digital/analog converter and a send signal filter provided in the send path, with the send signal filter being input-connected with the digital/analog converter and output-connected with the transmission unit, the digital/analog converter impressed with the send signal the send signal is tetravalent and the digital/analog converter includes two bits, whereby the FIR filter portion is so adaptively adjusted that non-idealities are corrected, the send signal filter produces a predetermined pulse form at the outlet of the send filter, and the send filter has a transfer function $T(s)=T_1(s)*T_2(s)$, wherein:

$$T_1(s) = 0.3940 * \frac{s^2 + 1.1834*10^6*s + 2.4134*10^{13}}{s^2 + 4.9598*10^6*s + 1.3263*10^{13}}$$

and $$T_2(s) = \frac{1}{0.3940} * \frac{6.1007*10^{12}}{s^2 + 5.2757*10^6*s + 1.1154*10^{13}}.$$

13. The signal circuit of claim 12, wherein characteristic pole positions, corresponding to the transmission characteristics of the two wire line, are fixed for the IIR filter portion.

* * * * *